Figure 1:
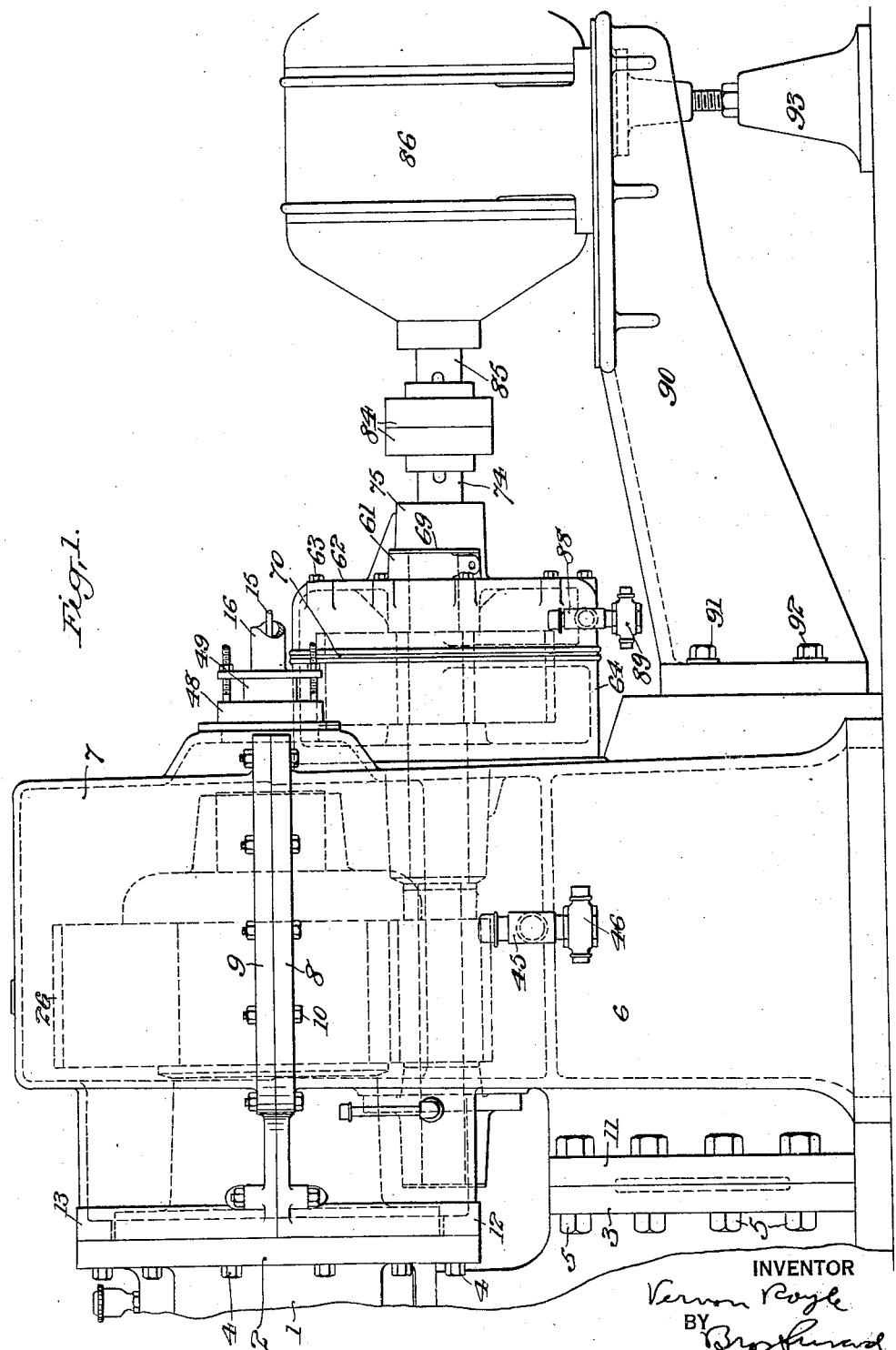

March 14, 1933.  V. ROYLE  1,901,569
GEAR CASING FOR TUBING MACHINES
Filed March 3, 1928  4 Sheets-Sheet 1

INVENTOR
Vernon Royle
BY
his ATTORNEYS

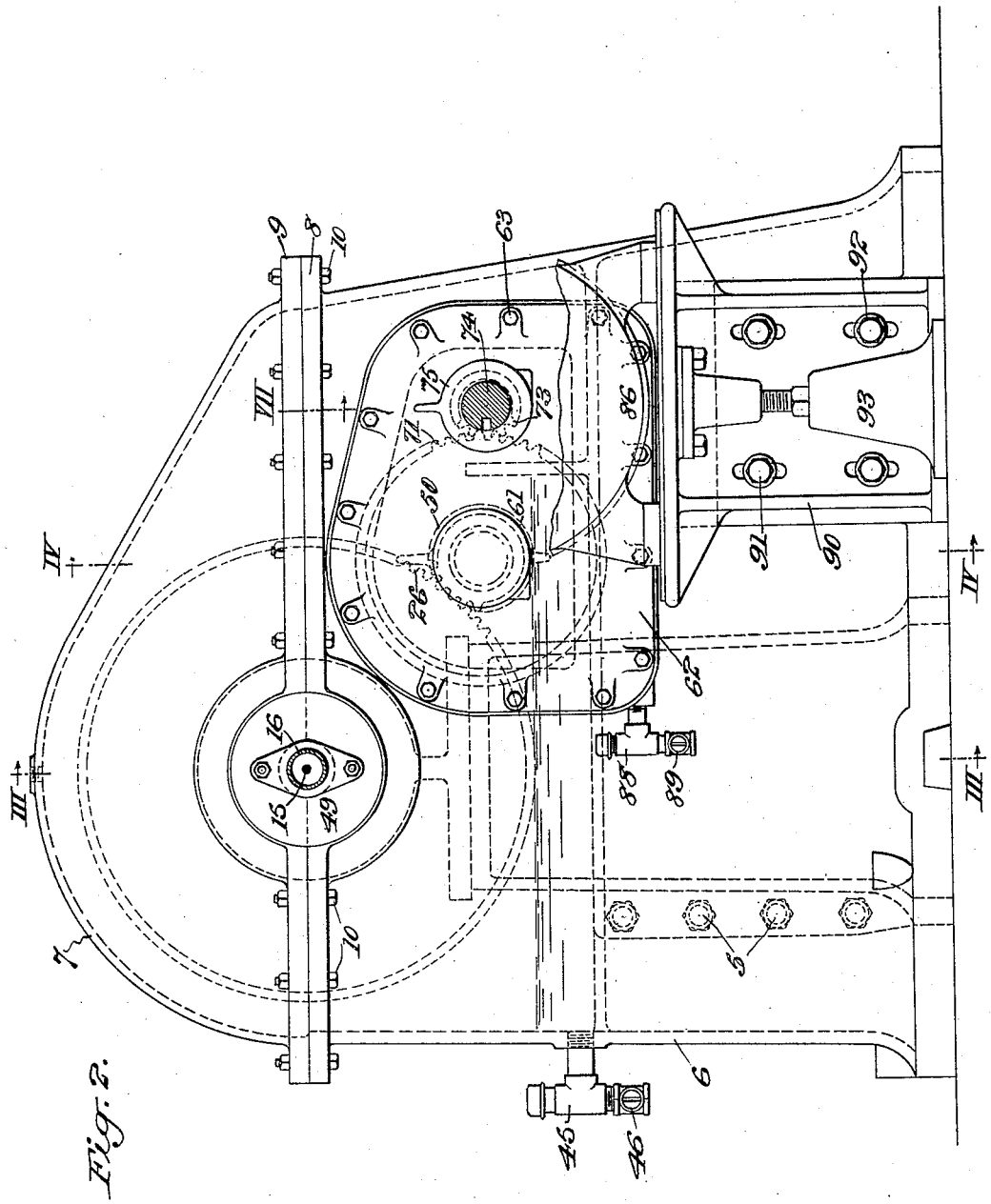

March 14, 1933.　　　V. ROYLE　　　1,901,569
GEAR CASING FOR TUBING MACHINES
Filed March 3, 1928　　4 Sheets-Sheet 3
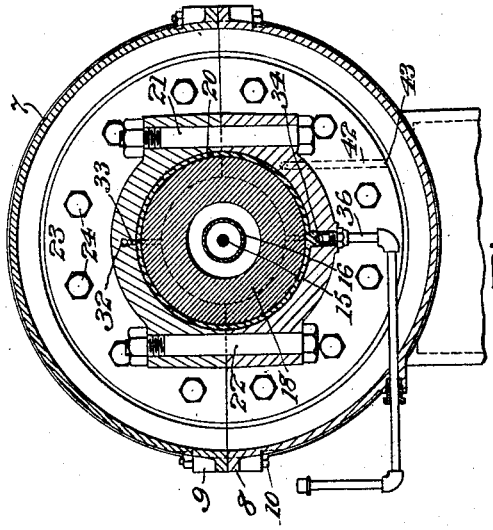
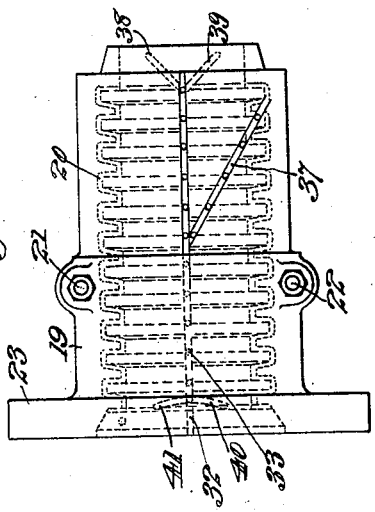
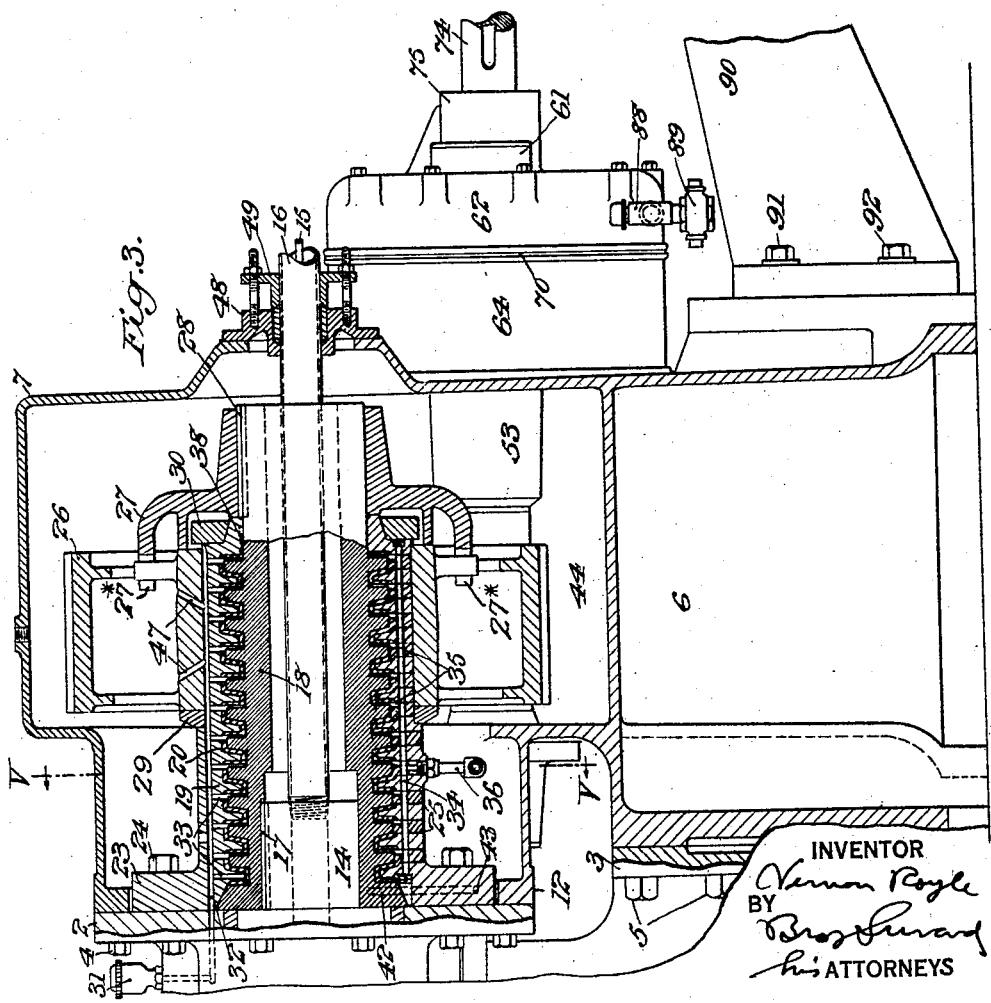
INVENTOR
Vernon Royle
BY
his ATTORNEYS

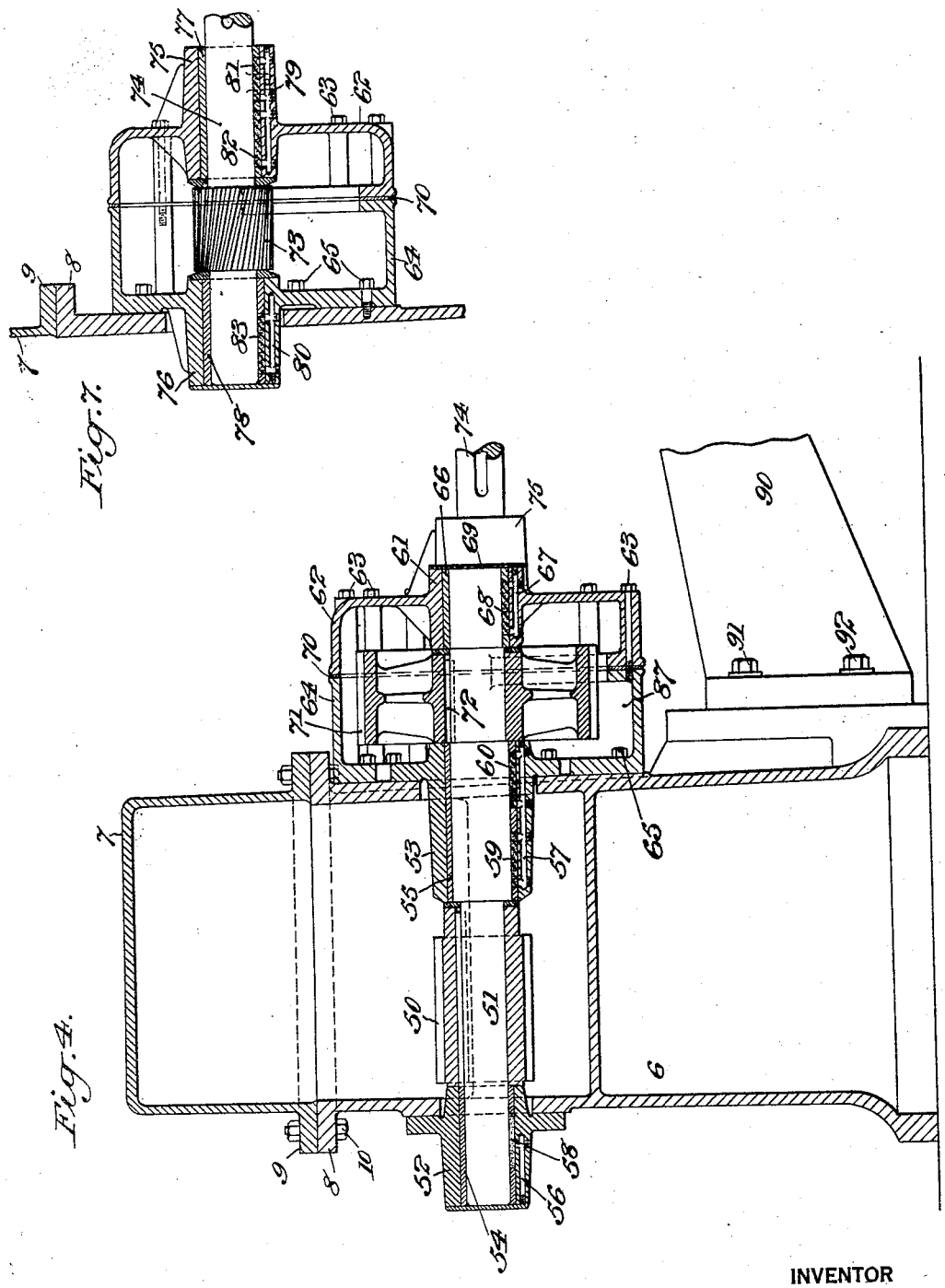

Patented Mar. 14, 1933

1,901,569

UNITED STATES PATENT OFFICE

VERNON ROYLE, OF PATERSON, NEW JERSEY

GEAR CASING FOR TUBING MACHINES

Application filed March 3, 1928. Serial No. 258,891.

This invention relates to a tubing machine and contemplates various structural improvements whereby manufacture and assembly is facilitated and effective operation enhanced.

One object is to provide such a machine having a housing formed in two separable sections, one for supporting the screw cylinder and the other for encasing the driving mechanism.

Another object consists in providing such a machine in which the housing section for the driving mechanism has a separable removable cover.

Another object consists in providing such a machine in which the speed changing gears are contained, as a unit, in a separable casing secured to the section of the housing that supports the main gear and associated parts.

Another object consists in providing such a machine in which oil wells are arranged in conjunction with the driving mechanism so as to provide for automatic and improved lubrication.

Another object consists in providing such a machine in which the section of the housing that encases the driving mechanism also adjustably supports a member that carries the motor.

A further object consists in providing certain improvements in the form, construction and arrangement of the several parts whereby the above named and other objects may effectively be attained.

A practical embodiment of the invention is represented in the accompanying drawings, in which Fig. 1 represents a detail side elevation of the machine, Fig. 2 represents a rear elevation thereof with the motor partly broken away, Fig. 3 represents a detail section taken in the plane of the line III—III of Fig. 2 looking in the direction of the arrows, Fig. 4 represents a section taken in the plane of the line IV—IV of Fig. 2 looking in the direction of the arrows, Fig. 5 represents a section taken in the plane of the line V—V of Fig. 3 looking in the direction of the arrows, Fig. 6 represents a top plan view of the thrust bearing, and Fig. 7 represents a detail vertical section taken in the plane of the line VII—VII of Fig. 2, looking in the direction of the arrow.

In tubing machines, as generally constructed, there is a housing or casing for supporting and enclosing the screw cylinder, to the front of which housing the tuber head is secured, and adjacent the rear of which housing the driving mechanism is mounted.

My invention comprehends a fundamental advance residing in the provision of a construction that embodies a housing section for the driving mechanism, which section is removably secured to the housing section for the screw cylinder; and this advance entails numerous features of novelty and advantage in the structural embodiment of the same disclosed in this application.

The housing section designed to support the screw cylinder is denoted by 1, and it includes an upper flange 2 and a lower flange 3, which flanges are designed to be secured by cap screws, or the like, 4 and 5, to complementary flanges on the housing section that encases the drive mechanism. As the particular construction of that section of the housing which supports the screw cylinder is not a part of this invention, the same is not shown and will not be described, because suitable forms for this part of the machine are well known in the art.

The housing section which encases the drive mechanism is composed of a lower main portion 6 and an upper portion 7 which constitutes a top or cover. The said lower and upper portions are formed with horizontally disposed mating flanges 8, 9, which are traversed by bolts 10 for the purpose of removably securing the said portions in assembly.

The lower portion 6 has the vertically disposed flange 11 which is complementary to the flange 3. The flange which is complementary to flange 2 is divided and composed of an under half 12 that is carried by the lower portion, and an upper half 13 that is formed on the top or cover 7.

The rear end of the screw, which may be of any well known or approved form, is marked 14, and it has threaded thereinto the usual inner and outer tubes 15, 16 for the circulation of a temperature controlling medium.

The said end of the screw is keyed, as indicated at 17, to a thrust piece 18. The said thrust piece is formed with peripheral ridges, as clearly shown in Fig. 3, which ridges are calculated to lie between cooperating ridges formed in an elongated thrust bearing 19, with the intermediation of layers of suitable anti-friction material 20 which may, for instance, be Babbitt metal.

The thrust bearing 19, with its anti-friction layers 20, is divided longitudinally, as clearly shown in Fig. 5, and is held in assembly by through bolts 21, 22.

Each half of the bearing 19 is formed with a semi-circular flange which, when the parts are in assembly, constitute an annular flange 23 that is secured by cap screws, or the like, 24, to flange 2 on the section 1 of the housing. This serves firmly to secure the thrust bearing in position because the flange 2 is, as previously described, fixed to the cover 7 and lower portion 6 of the section of the housing that encloses the driving mechanism.

The layers 20 of anti-friction material are prevented from moving in the bearing 19 by projections of the said layers, such as 25, that extend into holes in the lower half of the bearing. This positively locks the said layers against movement in the lower half of the bearing and the said layers are prevented from moving in the upper half by reason of their engagement with the layers in the lower half.

The main gear 26 is mounted on the thrust bearing 19 and is fixed to the thrust piece 18 by a spider 27 which is keyed to the thrust piece, as shown at 28, and has lugs 27 interengaging with the gear.

Rings 29 and 30 are driven on to the thrust bearing 19 and, if desired, pinned in position, at each side of the gear 26 in order to restrain it from axial movement. Ring 29 is held against axial movement on the bearing in one direction by a shoulder against which it abuts, as clearly shown in Fig. 3.

In order to provide adequate lubrication for the thrust bearing, an oil cup 31 is set into the section 1 of the housing and communicates with a channel 32 longitudinally disposed in the upper part of the bearing. The said channel has transverse branches 33 which extend inwardly to points intermediate the ridges formed on the bearing and thrust piece 18, so as to supply lubricant directly to the abutting walls or faces of the said ridges which receive the strain of the thrust during operation. The lower half of the bearing has a similar longitudinal oil channel 34 and transverse branches 35 which are fed from a supply pipe 36. Additional channels 37, 38, 39, 40, 41, with suitable branches, lead from the main channels 32 and 34 to other points where the ridges on the thrust piece 18 abut against the corresponding ridges on the bearing, as clearly shown in Fig. 6. Any excess of oil which may enter between the forward end of the thrust piece and the bearing 19 will be collected by a drain channel 42 (Figs. 3 and 5) that empties at a point between the lower part of flange 23 and flange 12, as indicated at 43.

For lubricating the main gear 26, an oil well 44 is formed in the lower part 6 of the housing and is supplied from a suitable filler 45, which latter also has a drain cock 46. The oil is maintained in this well at such height as to be engaged by the gear 26 during its rotation, thereby providing splash lubrication. A certain portion of the oil carried upwardly by the gear will trickle into the interior thereof and may be fed to the channel 32 of the thrust bearing by ducts 47.

The outer end of the tube 16 for the temperature controlling medium is supported in a stuffing box 48 fixed to the cover 7 and lower portion 6 of the housing, which stuffing box has the usual gland and connected parts 49. This prevents the oil from flying out of the housing during operation.

Rotary motion is imparted to the main gear 26 and hence, through the thrust piece 18, to the screw, by means of a pinion 50 that is splined to a shaft 51 which is mounted in the lower portion 6 of the housing. One end of shaft 51 is carried in a bearing 52 fast to one side of the said portion of the housing, and the intermediate portion of the shaft is mounted in a bearing 53 that is fixed to the opposite side of the said portion of the housing. The said bearings have suitable liners 54 and 55 and are also provided with suitable oil channels 56, 57, which are fed from oil cups, or the like, not shown. The channels 56 and 57 communicate with absorbent oil pads composed of felt or other suitable material and indicated by 58, 59, 60, for leading the lubricant directly to shaft 51.

The end of the said shaft opposite to bearing 52 projects from the housing and is journaled, as shown at 61, in the wall of an outer member 62 of an auxiliary casing; which said outer member is fixed by cap screws 63 to the inner member 64 of the auxiliary casing which is, in turn, fastened by cap screws 65 to the lower member 6 of the housing section for the drive mechanism.

The bearing 61 has a suitable liner 66, oil channel 67 and oil feeding pad 68.

A cap 69 serves to close the end of bearing 61 and prevent the leakage of oil; while a suitable packing ring 70 is inserted between the outer member 62 and the inner member 64 of the auxiliary casing for the same purpose.

A reduction gear 71 is keyed, as indicated at 72, on shaft 51 within the auxiliary casing, and it meshes with a motor drive pinion 73 that is fast on a shaft 74 mounted in bearings 75 and 76 carried by the members 62 and 64 of the auxiliary casing. The said bearings have suitable liners 77, 78, oil channels 79, 80, and oil supply pads 81, 82, 83.

Shaft 74 is connected by a clutch mechanism 84 with the power shaft 85 of a motor 86.

The auxiliary casing composed of the members 62 and 64 is so formed as to establish an oil well 87 in the bottom thereof for splash lubrication of the parts during operation, which oil well is fed by a supply pipe 88 that is also provided with a suitable drain cock 89. It will be clear that the pinion 50 which meshes with the main gear 26 is lubricated by contact with the latter and by the oil bath in the well 44 in the lower portion 6 of the housing for the drive mechanism.

The motor 86 is mounted on a bracket arm 90 that has its inner end fastened to the portion 6 of the housing by bolt and slot connections 91, 92. The outer end of the arm rests on an adjustable jack 93. This arrangement of the parts provides for accurate vertical adjustment of the motor with respect to the drive mechanism in order to maintain perfect alinement of the parts. The motor can be suitably mounted for lateral and rotary adjustment on the arm 90, in a well understood manner, for the same purpose.

As a result of the construction hereinabove described, there is obtained a machine of this character which may be manufactured and assembled with accuracy and expedition, which is very positive and effective in operation and which eliminates to a high degree the wear and tear and loss of power arising from friction. Furthermore, the provision of the auxiliary casing for the change speed gears and the mounting of the gears therein enables the said casing and gears to be removed, as a unit, and to be replaced by a similar casing having gears of different ratio, thus greatly facilitating changes in speed reduction which have frequently to be made in order to obtain the best results.

It will be understood that various changes may be resorted to in the form, construction and arrangement of the several parts without departing from the spirit and scope of my invention; hence, I do not intend to be limited to the details herein shown and described except as they may be included in the claims.

What I claim is:

1. In a tubing machine, the combination with the cylinder, screw and driving mechanism therefor, of a housing comprising two separable sections, one section serving as a base for the machine and supporting the cylinder, screw and driving mechanism on one vertical wall thereof, said driving mechanism being housed within the section, and the other section being carried by the opposite vertical wall of the first named section for encasing the reduction gearing.

2. In a tubing machine, the combination with the cylinder, screw and driving mechanism therefor, of a housing comprising two separable sections, one section serving as a base for the machine, a removable cover for said section, the coincident vertical walls of said section and cover being arranged to support the cylinder, screw and driving mechanism, and the other section being carried by the opposite vertical wall of the first named section for encasing the reduction gearing.

3. In a tubing machine, the combination with the cylinder, screw and driving mechanism therefor, of a housing comprising two separable sections, one section serving as a base for the machine, a removable cover for said section, the coincident vertical walls of said section and cover being arranged to support the cylinder, screw and driving mechanism, and the other section being removably secured to the opposite vertical wall of the first named section as a unit and encasing the reduction gearing.

4. In a tubing machine, the combination with the cylinder, screw, thrust bearing and driving mechanism for the screw, of a housing comprising two separable sections, one section serving as a base for the machine and supporting the cylinder, screw and thrust bearing on one vertical wall thereof, said thrust bearing and driving mechanism being housed within the section, and the other section encasing the reduction gearing, said last named section being vertically divided into two parts and carried by the opposite vertical wall of the first named section.

5. In a tubing machine, the combination with the cylinder, screw, thrust bearing and driving mechanism for the screw, of a housing comprising two separable sections, one section serving as a base for the machine, a removable cover for said section, the coincident vertical walls of said section and cover being arranged to support the cylinder, screw, thrust bearing and driving mechanism, said thrust bearing and driving mechanism being housed within the section and cover, and the other section encasing the reduction gearing, said last named section being vertically divided into two parts, said parts being removably secured to the opposite vertical wall of the first named section as a unit.

6. In a tubing machine, the combination with the cylinder, screw and driving mechanism therefor, of a housing comprising two separable sections, one section serving as a base for the machine and supporting the cylinder, screw and driving mechanism on one vertical wall thereof, said driving mechanism being housed within the section, the other section being carried by the opposite vertical wall of the first named section for encasing the reduction gearing, and a bracket adjustably secured to the last named vertical wall for carrying the motor in position to drive the reduction gearing.

In testimony, that I claim the foregoing as my invention, I have signed my name this 2nd day of March, 1928.

VERNON ROYLE.